United States Patent
Stokes et al.

(10) Patent No.: US 7,460,270 B2
(45) Date of Patent: Dec. 2, 2008

(54) EVALUATION OF COLOR IMAGE QUALITY

(75) Inventors: Michael Stokes, Eagle, ID (US);
Anthony M. Presley, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1034 days.

(21) Appl. No.: 10/793,044

(22) Filed: Mar. 4, 2004

(65) Prior Publication Data
US 2005/0195416 A1 Sep. 8, 2005

(51) Int. Cl.
*H04N 1/56* (2006.01)

(52) U.S. Cl. ............. 358/1.9; 358/3.24; 345/1.3; 345/419; 382/112

(58) Field of Classification Search ......... 358/1.2, 358/1.9, 504, 3.24; 382/112, 141; 345/1.1, 345/1.3, 418, 419, 428
See application file for complete search history.

(56) References Cited

U.S. PATENT DOCUMENTS

| | | | |
|---|---|---|---|
| 6,349,151 B1 * | 2/2002 | Jones et al. | 382/251 |
| 6,381,372 B1 * | 4/2002 | Loce | 382/261 |
| 6,571,000 B1 * | 5/2003 | Rasmussen et al. | 382/112 |
| 6,597,473 B1 * | 7/2003 | Rasmussen et al. | 358/1.9 |
| 6,608,932 B1 * | 8/2003 | Rasmussen et al. | 382/112 |
| 6,639,999 B1 * | 10/2003 | Cookingham et al. | 382/112 |
| 6,658,139 B1 * | 12/2003 | Cookingham et al. | 382/112 |
| 6,912,071 B1 * | 6/2005 | Rasmussen et al. | 382/112 |
| 7,164,807 B2 * | 1/2007 | Morton | 382/269 |
| 2004/0213480 A1 * | 10/2004 | Morton | 382/269 |

OTHER PUBLICATIONS

Xuemei Zhang, *S-CIELAB: A Spatial Extension to the CIE L\*a\*b\* DeltaE Color Difference Metric* Webpage (1998) [Obtained on Aug. 2, 2005 from the Internet at http:/white.stanford.edu/%7Ebrian/scielab/].

Xuemei Zhang, *S-CIELAB: A Spatial Extension to the CIE L\*a\*b\* DeltaE Color Difference Metric* Webpage, Webpage available via "Introduction to S-CIELAB" hyperlink (1998) [Obtained on Aug. 2, 2005 from the Internet at http:/white.stanford.edu/%7Ebrian/scielab/introduction.html].

Xuemei Zhang, *S-CIELAB: A Spatial Extension to the CIE L\*a\*b\* DeltaE Color Difference Metric* Webpage, Webpages available via "S-CIELAB Matlab Implementation" hyperlink (1998) [Obtained on Aug. 2, 2005 from the Internet at http:/white.stanford.edu/%7Ebrian/scielab/codeExample.html].

Xuemei Zhang, *S-CIELAB: A Spatial Extension to the CIE L\*a\*b\* DeltaE Color Difference Metric* Webpage, Webpage available via "browse the files in the SCIELAB distribution" hyperlink (1998) [Obtained on Aug. 2, 2005 from the Internet at http:/white.stanford.edu/brian/scielab/scielab1-1-1/].

(Continued)

*Primary Examiner*—Kimberly A Williams (57) ABSTRACT

The disclosed method diminishes the resolution or the perceived resolution of images and compares the images to evaluate the color image quality of images. The method determines how far away images have to be or how much the resolution needs to be reduced for the images to be perceived as the same. A smaller viewing distance or a lower reduction in resolution corresponds to a closer similarity between the images. A relatively longer viewing distance or a greater reduction in resolution where the visual difference becomes unperceivable is indicative of a large difference between the images.

56 Claims, 8 Drawing Sheets

OTHER PUBLICATIONS

Xuemei Zhang, *S-CIELAB: A Spatial Extension to the CIE L\*a\*b\* DeltaE Color Difference Metric* Webpage, Webpage available via "Some related papers to read" hyperlink (1998) [Obtained on Aug. 2, 2005 from the Internet at http:/white.stanford.edu/%7Ebrian/scielab/references.html/].

[Author Unknown], CIE International Commission on Illumination Technical Report, A Colour Appearance Model for Colour Management Systems: CIECAM02, CIE 159:2004, ISBN 3901906290, pp. I-VI; 1-16; 'publications section' consisting of 3 pages (2004).

Poirson et al., *The appearance of colored patterns: pattern-color separability*, Department of Psychology, Stanford University, Stanford, CA 94305, pp. 1-38 (1993) [Obtained from *J. Opt. Soc. Am. A* (1993), v. 10, n.12, pp. 2458-2470].

Poirson et al., *Pattern-color separable pathways predict sensitivity to simple colored patterns*, Department of Psychology, Stanford University, Stanford, CA 94305, *Vision Research*, in press, Accepted Mar. 1995, pp. 1-37 (1995).

Bäuml et al., *Color Appearance of Mixture Gratings*, Department of Psychology, Stanford University, Stanford, CA 94305, pp. 2849-2864 (1996).

Zhang et al., *A Spatial Extension of CIELAB for Digital Color Image Reproduction*, Department of Psychology, Stanford University, Stanford, CA 94305, pp. 1-6 (publication year unknown).

Zhang et al., *Color Image Quality Metric S-CIELAB and Its Application on Halftone Texture Visibility*, Department of Psychology, Stanford University, Stanford, CA 94305; Hewlett Packard Laboratories, 1501 Page Mill Road, Palo Alto, CA 94304, pp. 1-5 (publication year unknown).

Zhang et al., *Applications of a spatial extension to CIELAB*, Department of Psychology, Stanford University, Stanford, CA 94305; Hewlett Packard Laboratories, 1501 Page Mill Road, Palo Alto, CA 94304, pp. 1-4 (publication year unknown).

Zhang et al., *Color Image Fidelity Metrics Evaluated Using Image Distortion Maps*, Hewlett Packard Laboratories, Imaging Technology Department, 1501 Page Mill Road, MS *I U-20*, Palo Alto, CA 94304; Image Systems Engineering Program, Stanford University, Blg. 420, Stanford, CA 94305, pp. 1-23 (publication year unknown).

T. Song and M.R. Luo, *CIE TC8-02 Summary Report From Sano et al's Results*, Oct. 4, 2004.

CIE TC8-02 Technical Report, *Methods for Deriving Colour Differences in Images*, Draft Version 0.07, Oct. 2004.

Schwarz et al., "An Experimental Comparison of RGB, YIQ, LAB, HSV, and Opponent Color Modules," ACM Transactions on Graphics, vol. 6, No. 2, pp. 123-158 (1987).

Stone et al., "Color Gamut Mapping and the Printing of Digital Color Images," ACM Transactions on Graphics, vol. 7, No. 4, pp. 249-292 (1988).

Stokes et al., "Precision Requirements for Digital Color Reproduction," ACM Transactions on Graphics, vol. 11, No. 4, pp. 406-422 (1992).

* cited by examiner

EVALUATION OF COLOR IMAGE QUALITY

FIELD OF THE INVENTION

The present disclosure concerns evaluation of color image quality and, in particular, the present disclosure concerns a method evaluating color image quality by reducing actual or perceived resolution of color images.

BACKGROUND ART

Image fidelity is subjective, making it difficult to compare or assess changes or differences in images in a quantitative way. Quantitative metrics for assessing or comparing output images are important, because these metrics enable performance measurements of image output devices, such as computer printers, computer monitors, and televisions. These quantitative metrics also allow image fidelity of image output devices to be discussed in a measurable and non-subjective way.

Two existing methods for assessing image output are (1) qualitative assessments by a group of non-color deficient people and (2) measuring sample patches or spots of applied colors using a spectrophotometer, a calorimeter or, a densitometer and applying a formula, such as a CIE Delta E* formula, to compare the measurement to an expected value or another measured value. Qualitative assessment involves presenting output images to a group of non-color deficient people. The group reviews the output images and provides an assessment of the output images. Qualitative assessment by a group of people is useful in assessing image fidelity, since image fidelity is subjective, and the perception of people is what ultimately matters. However, since this method produces a variety of qualitative assessments (people typically have slightly different opinions), gauging changes or differences in output images with qualitative assessments by a group of people is difficult. Also, qualitative assessments are not particularly helpful in determining how much output images have improved or degraded, how much the output image needs to improve to be acceptable, or determine what an acceptable output image is.

Figure 2:
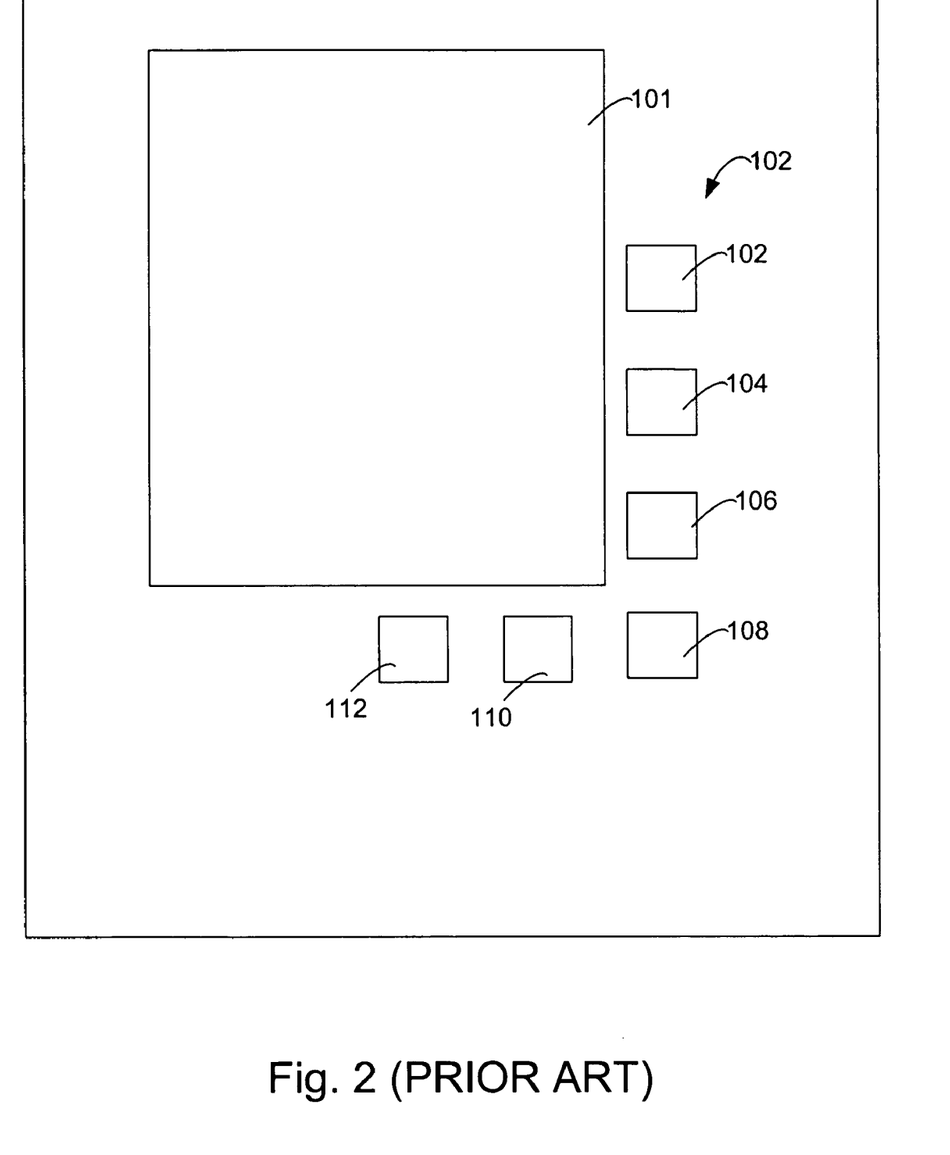
FIG. 2 illustrates a page used in a prior art method of measuring sample patches of applied colors to predict image output quality.

Prior art FIG. 2 illustrates an example of measuring sample patches of applied colors to predict quality of an output image 101. In the example of FIG. 2, a color printer applies patches 100 or spots, each intended to have a uniform color. In the example, a cyan patch 102, a magenta patch 104, a yellow patch 106, a black patch 108, a white patch 110, and a grey patch 112 are defined. Each patch is measured using a spectrophotometer, a calorimeter, or a densitometer. A formula is applied to the measured value of each patch to arrive at a value for each patch. This value for each patch is compared for the correct value for the intended color of each patch. This method assumes that if the values for each patch are correct and the right amount of ink is put down, the quality of the image 101 should be acceptable. This method is used to control the quality of the print process, but does not directly measure the quality of the image 101.

Measuring color patches and applying a formula, such as CIE Delta E*, provides a quantitative metric to apply to image fidelity. However, measuring anything other than sizeable patches where the color is uniform is difficult. The color measurement in this method is measured for an area, averaging the color over that area. This method only addresses measuring how different, distinct colors appear, but doesn't address comparing the overall appearance of images. The results of this method could indicate that a color patch is good, when the appearance is very different than intended. For example, in the case of a yellow patch where cyan dots are added, the color measurement will average over the area, but a human eye will identify the contrast. In addition, measuring color patches does not address changes that do not affect color. For example, changes in resolution or dithering and halftoning that may result in Moirés patches are not addressed by color patch measuring.

There is a need for a method for measuring color image fidelity or quality that allows the overall appearance of an output image to be assessed in a qualitative way.

SUMMARY

The present disclosure concerns a method of evaluating color image quality or fidelity of an output image from an image output device. In the method an output image from the image output device and a second image are viewed from a view point. The distance between the viewpoint and the images are increased or the resolution of the images is decreased until differences between the output image and the second image become unperceivable from the view point. A distance between the view point and the images or a reduced resolution where visual differences between the output image and the second image become unperceivable is then identified. The identified distance or resolution where the visual differences between the images become unperceivable is used as a measure of color image quality.

In one embodiment, the method is performed by a human viewer. In this embodiment, a viewer may be selected that is non-color deficient. The output image may be a printed color photograph from a color printer, an image provided on a monitor or an image projected by an image projecting device onto a surface, such as a screen. The second image may be a reference or control color photograph, or a reference or control image provided on a reference or control monitor, or a reference or control image projected by a reference or control image projecting device.

In one embodiment, a relatively shorter identified distance or a relatively higher resolution where the visual difference becomes unperceivable is indicative of high color image quality. A relatively longer identified distance or a relatively lower resolution where the visual difference becomes unperceivable is indicative of low color image quality. The second image and an acceptable distance or resolution where a visual difference between the output image and the second image become unperceivable may be provided as part of a specification of the image output device.

In one embodiment, the distance between the view point and the images or the resolution where differences between the images become unperceivable is identified for several different lighting conditions. In one embodiment, the method is used to evaluate several images at once. In this embodiment, several images are viewed from the view point and a distance between the view point and the images or a diminished resolution is identified where visual differences between the several images become unperceivable.

In one embodiment, the images are compared as viewed from a plurality of predefined distances. The shortest predefined distances where a difference between the output image and the second image cannot be perceived is identified. This distance is used as a measure of color image quality.

In one embodiment, the images are viewed from a single set distance. If differences between the image cannot be perceived from the set distance, the color image quality is acceptable. If differences between the images can be perceived from the set distance, the color image quality is unacceptable.

In one embodiment, the color image quality of an output image from an image output device is evaluated by changing the resolution of the output image and the second image. In this embodiment, the output image and the second image are compared as displayed in several predefined resolutions. A highest one of the predefined resolutions is identified where a difference between the images cannot be perceived. The identified resolution is used as a measure of color image quality.

In one embodiment, the method is performed by executing computer-executable instructions. The computer executable instructions may include instructions that prompt a human user to perform one or more steps of the method.

In one embodiment, the method is used in a system for user evaluation of color image quality of an output image. The system includes a user input device, a user output device for providing the output images, a memory in which machine instructions are stored, and a processor that is coupled to the user input device, to the image output device, and to the memory. The processor executes the machine instructions to carry out a plurality of functions. The processor causes the image output device to provide an output image, prompts a user to compare the output image and a second image from a plurality of predefined distances, prompts the user to enter a shortest one of the plurality of predefined distances where a difference between the output image and the second image cannot be perceived, and determines whether the color image quality of the output image is acceptable based on the distance entered by the user.

These and other objects and advantages of the system constructed in accordance with an exemplary embodiment of the invention is more completely described in conjunction with the accompanying drawings.

DETAILED DESCRIPTION

Exemplary Operating Environment

Figure 1:
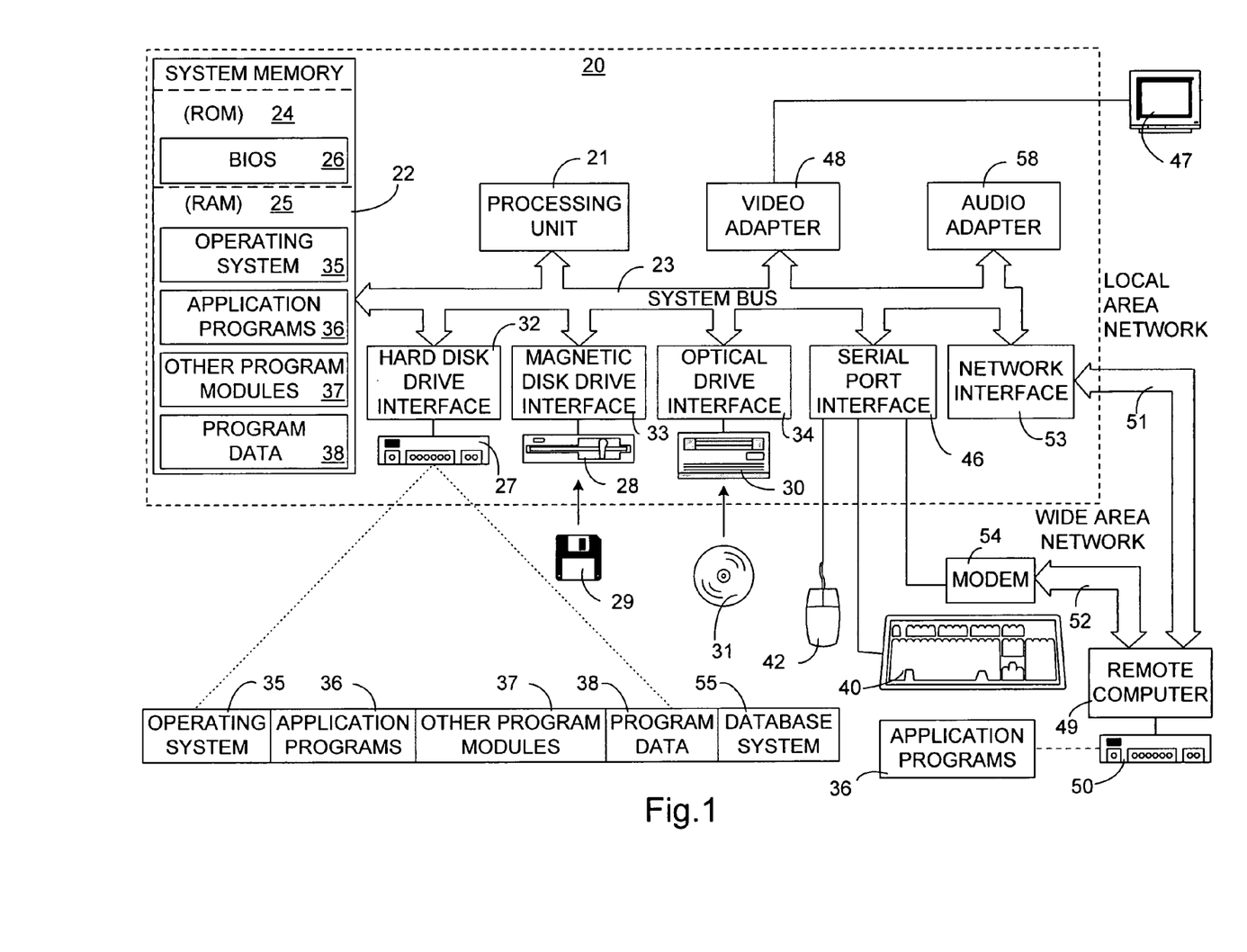
FIG. 1 is a schematic depiction of a computer system used in practicing an exemplary embodiment of the disclosed method.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 24 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disk drive 30 for reading from or writing to a removable optical disk 31 such as a CD ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk 27, a removable magnetic disk 29 and a removable optical disk 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk 27, magnetic disk 29, optical disk 31, ROM 24 or RAM 25, including an operating system 35, one or more application programs 36, other program modules 37, and program data 38. A database system 55 may also be stored on the hard disk, magnetic disk 29, optical disk 31, ROM 24 or RAM 25. A user may enter commands and information into personal computer 20 through input devices such as a keyboard 40 and pointing device 42. Other input devices may include a microphone, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a widearea network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over wide area network 52, such as the Internet. Modem 54, which may be internal or external, is connected to system bus 23 via serial port interface 46. In a networked environment, program modules depicted relative to personal computer 20, or portions thereof, may be stored in remote memory storage device 50. It will be appreciated that the network connections shown are exemplary and other means of establishing a communications link between the computers may be used.

Method of Evaluating Color Image Quality

Figure 3:
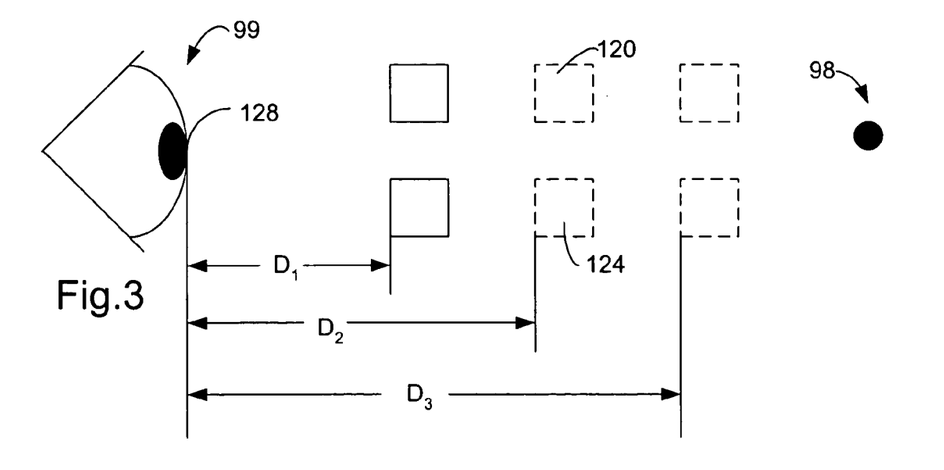
FIG. 3 schematically illustrates viewing images from a varying distances.

Referring to FIG. 3, the human eye 99 perceives less detail as an object moves further away from an observer. That is, the effective resolution of the object perceived by the human eye 99 is reduced or diminished as the object moves further away. With digitally encoded images, the resolution can be expressly diminished or increased. The disclosed method diminishes the resolution or the perceived resolution of images and compares the images to evaluate their color image quality. The method determines how far away images have to be or how much the resolution needs to be reduced for the images to be perceived as the same. A smaller viewing distance or a lower reduction in resolution corresponds to a closer similarity between the images. A relatively longer viewing distance or a greater reduction in resolution is indicative of a large difference between the images. Even vastly different images or objects appear the same if the viewing distance is great enough. In fact, every object looks the same just before a vanishing point 98. The vanishing point 98 is the point at which an image is no longer visible by the viewer.

Figure 6A:
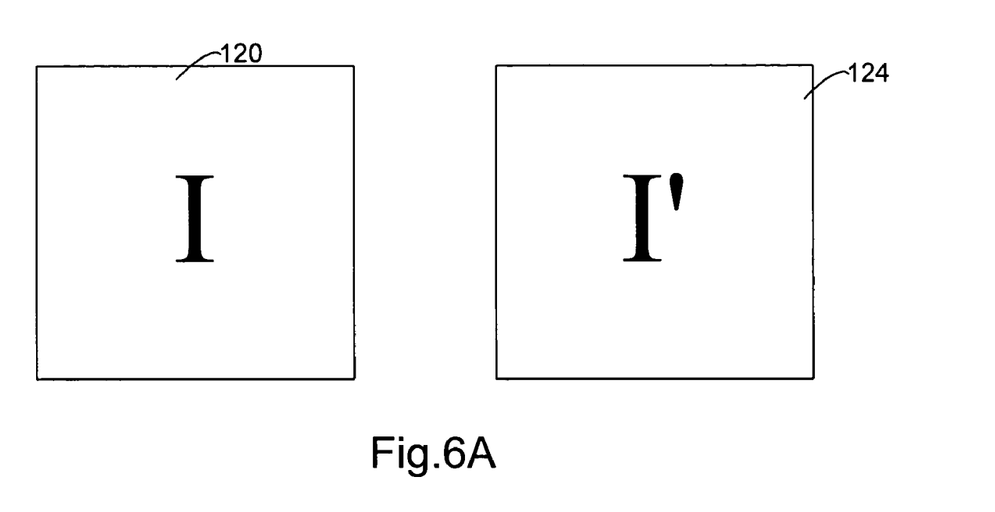
FIG. 6A schematically illustrates viewing images at a distance where differences between the images are perceivable.
Figure 6B:
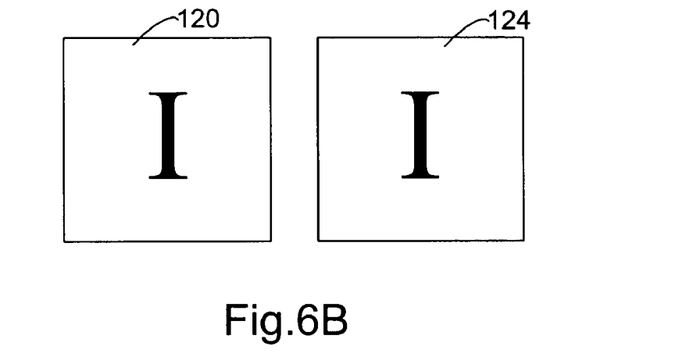
FIG. 6B schematically illustrates viewing the images of FIG. 6A at a distance where differences between the images are unperceivable.
Figure 7:
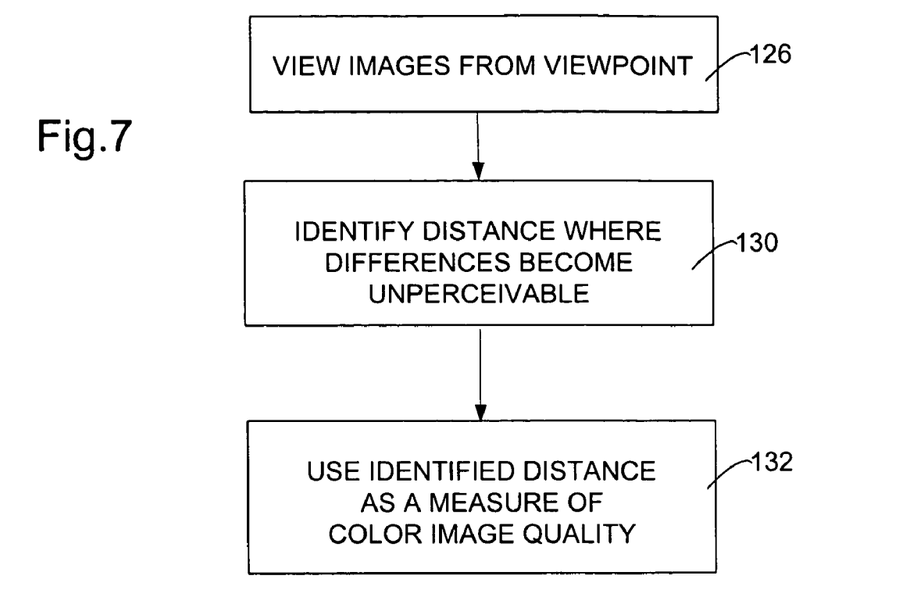
FIG. 7 is a flow chart that illustrates a method of evaluating color image quality of an output image from an image output device.
Figure 11:
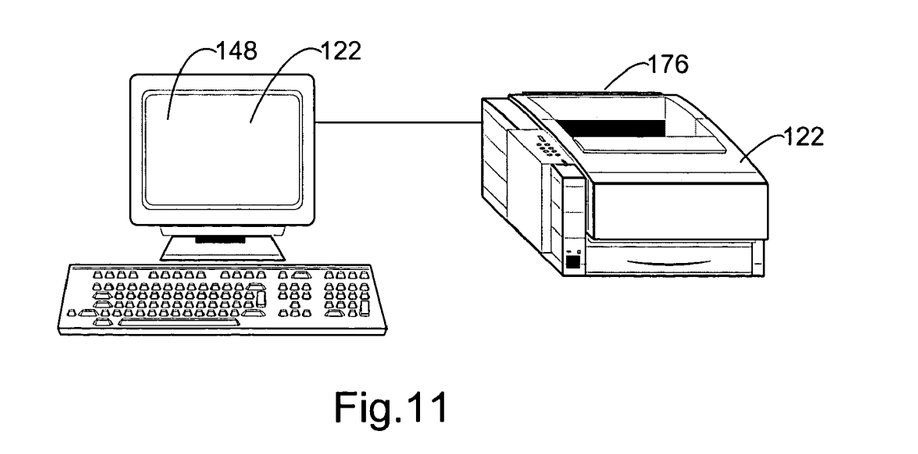
FIG. 11 is an illustration of a computer system that includes image output devices.

FIGS. 3, 6A-6B, and 7, illustrate a method of evaluating color image quality or fidelity of an output image 120 from an image output device 122 (FIG. 11). In the method, the output image 120 and a second image 124 are viewed 126 from a view point 128. Referring to FIG. 3, the distance between the images 120, 124 and the view point 128 is increased until differences between the images 120, 124 become unperceivable. FIG. 6A illustrates that differences between images 120, 124 are perceivable when the distance between the images and the view point is relatively short. FIG. 6B illustrates that differences between images 120, 124 eventually become unperceivable as the distance between the images and the view point is increased. Referring to FIGS. 3 and 7, the distance between the view point and the images 120,124 is identified 130 where a visual difference between the output image and the second image becomes unperceivable. The identified distance where the visual difference becomes unperceivable is used 132 as a measure of color image quality or fidelity.

Figure 8:
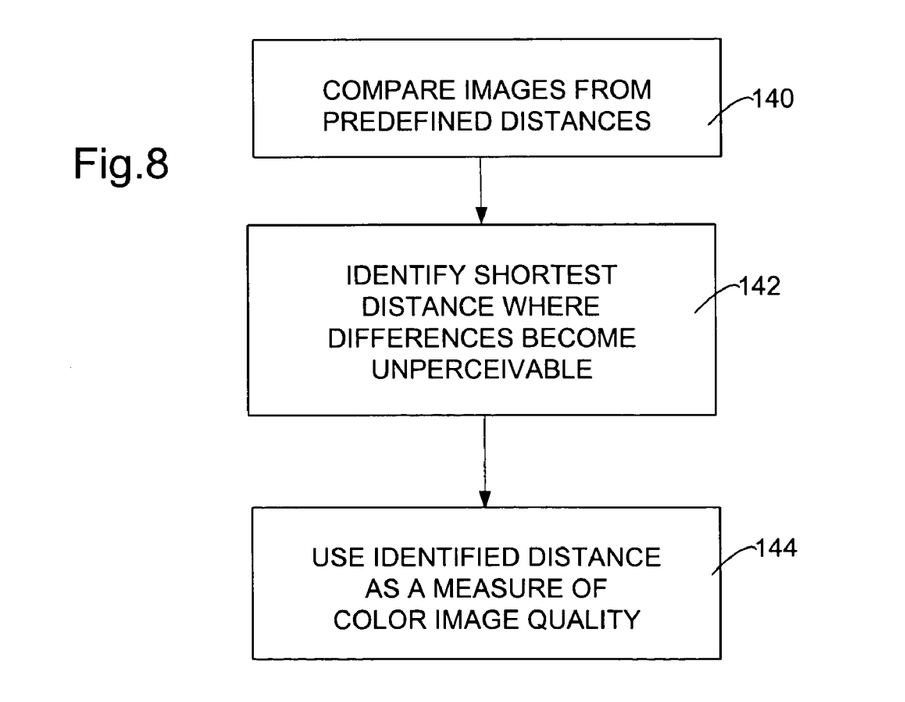
FIG. 8 is a flow chart that illustrates a method of evaluating color image quality of an output image from an image output device.

Referring to FIGS. 3 and 8, the images 120, 124 are compared 140 as viewed from several predefined distances $D_1$-$D_3$ in one embodiment. In this embodiment, the shortest predefined distance where a difference between the output image 120 and the second image 124 cannot be perceived is identified 142. In this embodiment, FIG. 6A illustrates that differences between the images are perceivable when the images are viewed from a relatively shorter distance, such as distance $D_1$. FIG. 6B illustrates that differences between the images become unperceivable when the images are viewed from a relatively longer distance, such as distance $D_3$. The shortest predefined distance where differences between the images become unperceivable is used 144 as a measure of color image quality.

Figure 4:
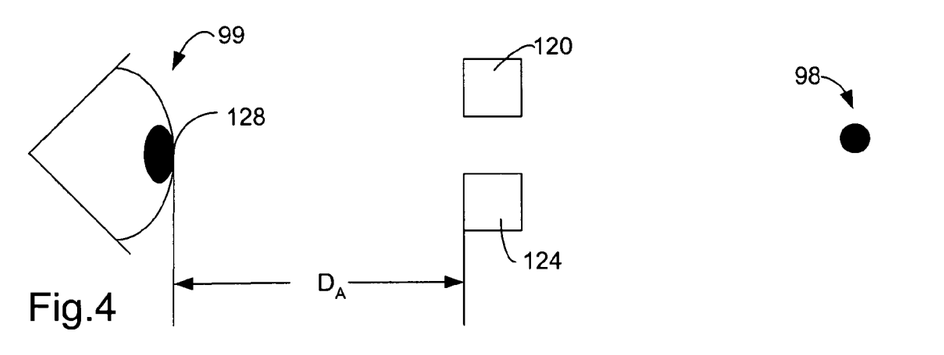
FIG. 4 schematically illustrates viewing images from a set distance.
Figure 9:
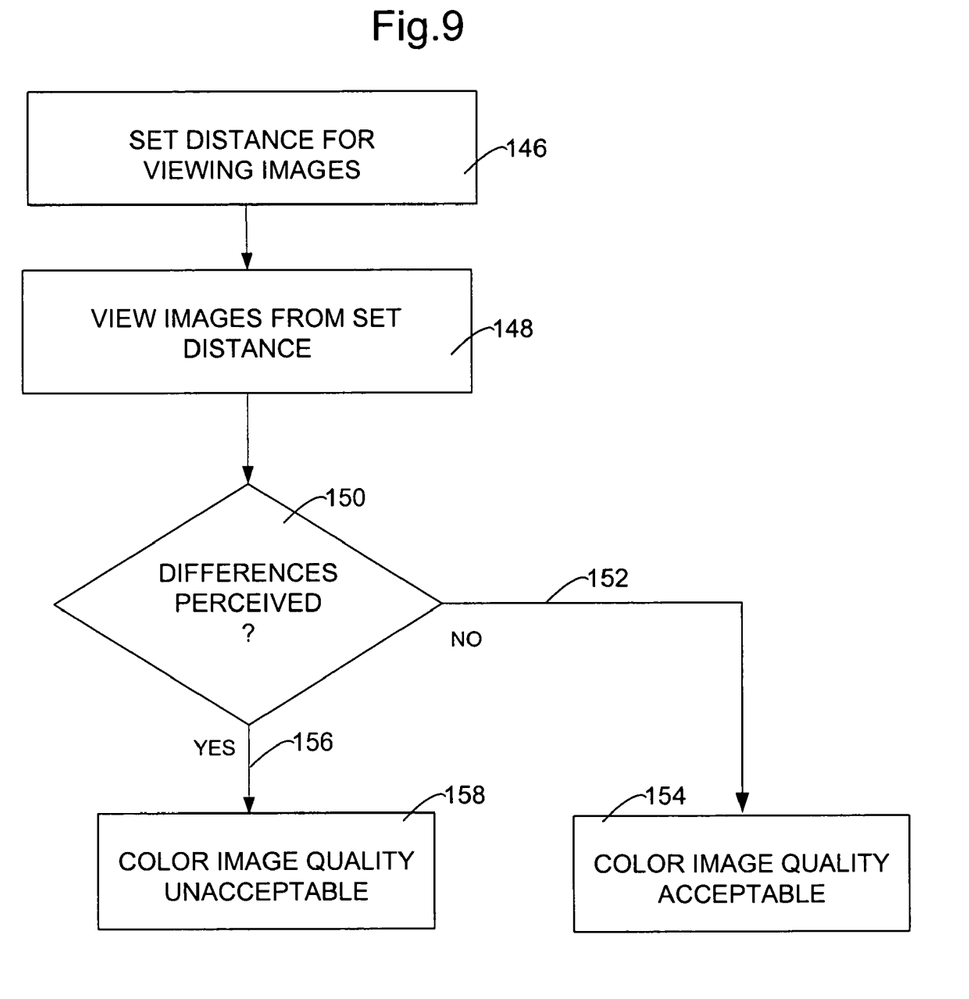
FIG. 9 is a flow chart that illustrates a method of evaluating color image quality of an output image from an image output device.

Referring to FIGS. 4 and 9, an acceptable distance $D_A$ is set 146 for viewing the images 120, 124 in one embodiment. The images are viewed 148 from the single set distance $D_A$. The method determines 150 whether differences can be perceived from the set distance $D_A$. If differences between the image cannot be perceived 152 from the set distance, the color image quality is acceptable 154. FIG. 6B illustrates the situation where differences between images 120, 124 are not perceivable from the set distance $D_A$. If differences between the images can be perceived 156 from the set distance, the color image quality is unacceptable 158. FIG. 6A illustrates the situation where differences between images 120, 124 are perceivable from the set distance $D_A$.

Figure 6C:
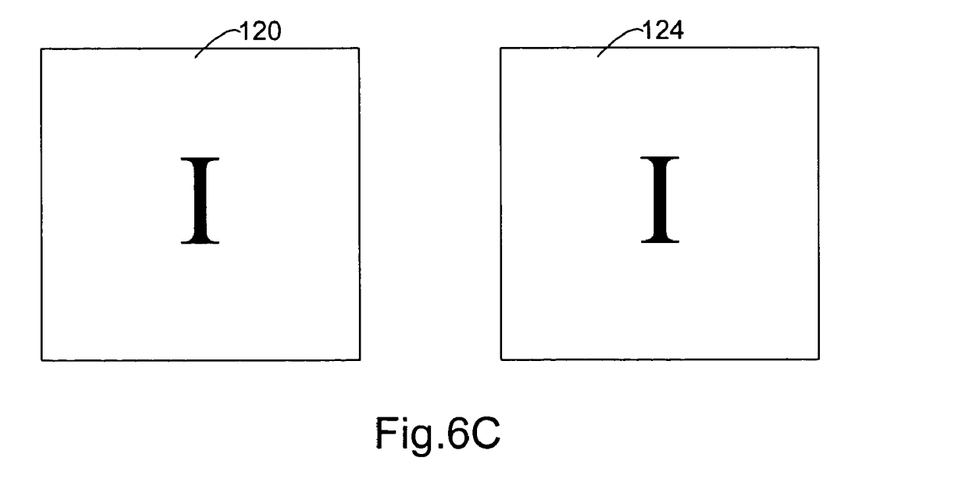
FIG. 6C schematically illustrates viewing the images of FIG. 6A with a diminished resolution where differences between the images are unperceivable.
Figure 10:
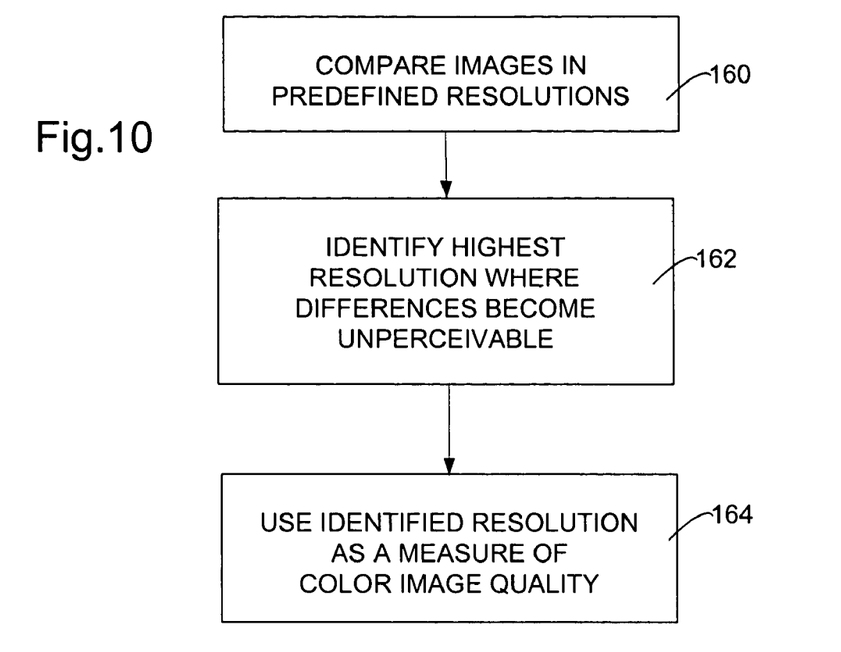
FIG. 10 is a flow chart that illustrates a method of evaluating color image quality of an output image from an image output device.

Referring to FIGS. 6A, 6C, and 10, the color image quality of an output image 120 from an image output device 122 is evaluated by changing the resolution of the output image 120 and the second image 124 in one embodiment. In this embodiment, the output image 120 and the second image 124 are compared 160 as displayed in several predefined resolutions. A highest one of the plurality of predefined resolutions is identified 162 where a difference between the images cannot be perceived. In this embodiment, FIG. 6A illustrates that differences between the images are perceivable when the images are viewed in a relatively higher resolution. FIG. 6C illustrates that differences between the images become unperceivable when the images are viewed in a relatively lower resolution. The identified resolution is used 164 as a measure of color image quality.

In the exemplary embodiment, the images 120, 124 are viewed by a human viewer. The human observer views the images from different viewpoints or in different resolutions and determines when the differences between the images become unperceivable.

Figure 12:
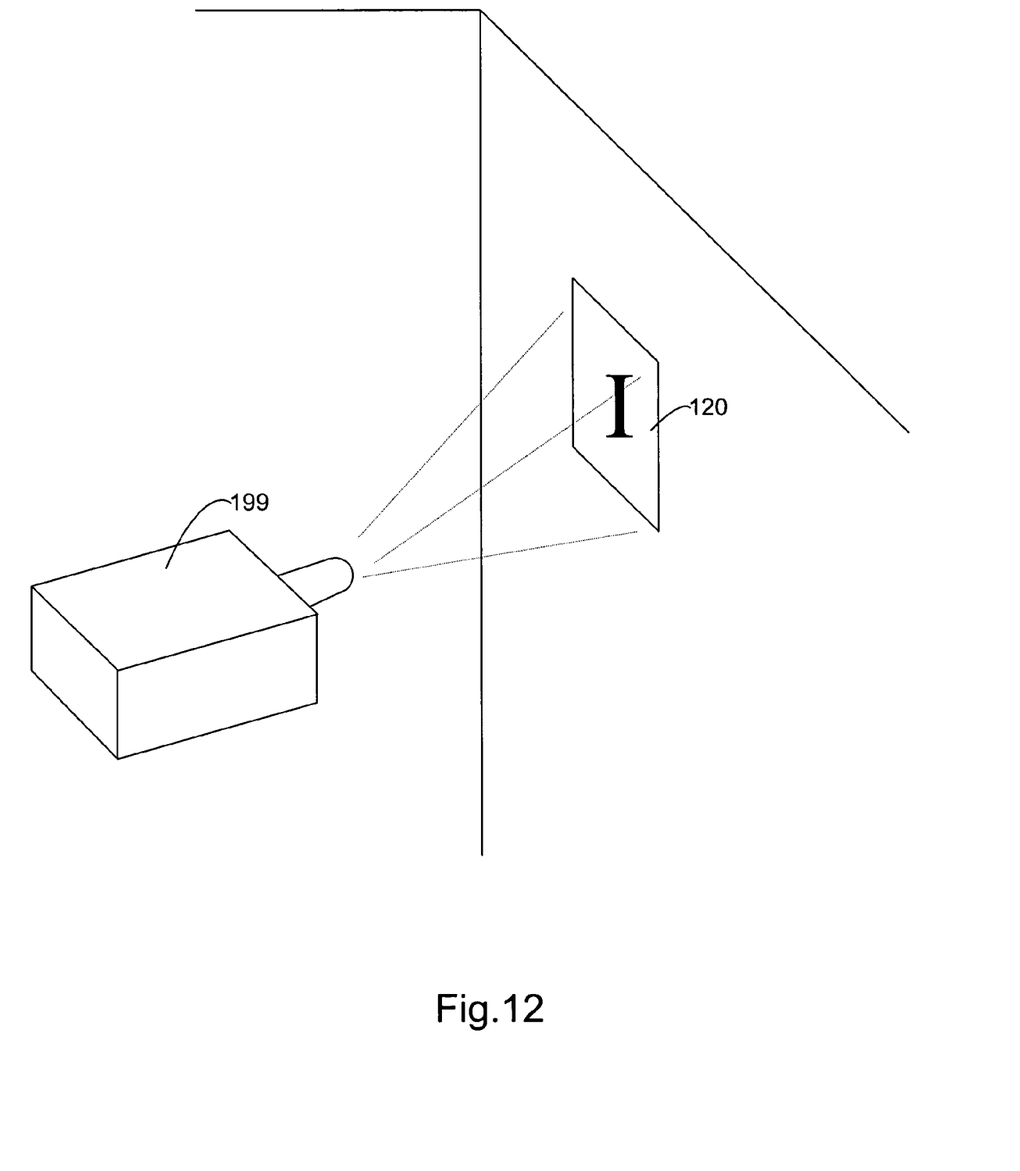
FIG. 12 is an illustration of an image projecting image output device.

The present method can be used with a wide variety of available image output devices. For example, the present method can be used to measure the color image quality of the output images of computer displays 47, televisions, printers 176, image projecting devices 199, such as projectors and projection televisions. Images can be provided for projection by image projecting devices from a variety of devices. For example the images to be projected can be provided from video outputs from VCR's, DVD players, computers, etc.

In one embodiment, the second image 124 is a control or test image that represents the desired image output from the output device. One or more control images and an acceptable distance where a visual difference between the output image 124 and the control image become unperceivable may be provided as part of a specification of an image output device, such as a color printer 176. In this embodiment, a relatively shorter identified distance where the visual difference between the output image and the control image becomes unperceivable is indicative of high color image quality. That is, the output image is very similar to the control image, which is the desired result. Conversely, a relatively longer identified distance where the visual difference between the output image and the control image becomes unperceivable is indicative of low color image quality. That is, the output image is not similar to the control image.

When evaluating the image output of a color printer, the second image 124 is a reference color photograph that represents the desired output. The embodiments of the method where images are evaluated by viewing the images at a distance work well with printed color photographs from a color printer.

When evaluating the image output of a computer monitor, the test or control image is a reference image provided on a reference monitor that represents the desired output. The embodiments of the method where images are evaluated by changing the resolution of the images work well with images that are digitally encoded, such as images that are provided on a high resolution monitor.

In one embodiment, the second image 124 is an image provided by the image output device 122. In this embodiment, the method is used to measure consistency of images produced by the image output device.

Figure 5:
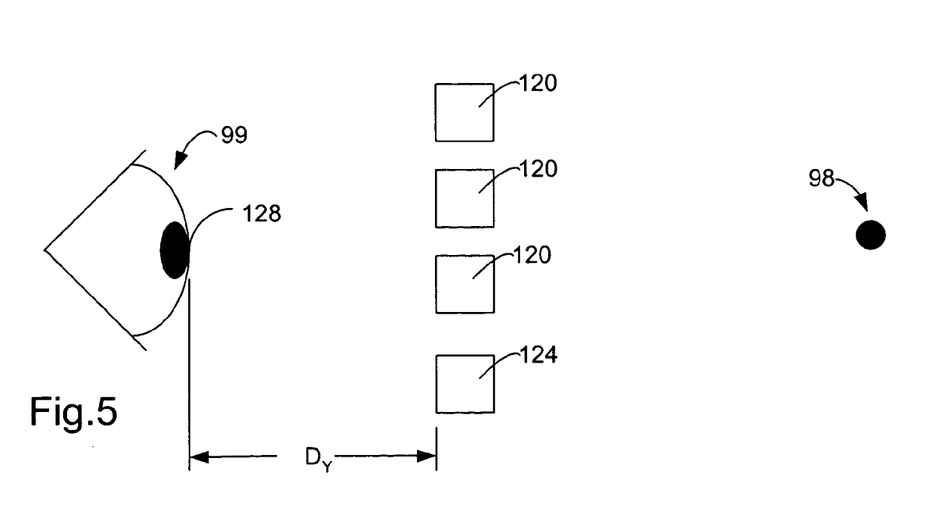
FIG. 5 schematically illustrates viewing multiple images.

Referring to FIG. 5, in one embodiment the present method is used to evaluate the color quality of several images at once. In this embodiment, several images are viewed from the view point. A distance $D_Y$ between the view point and the images is identified where visual differences between the several images become unperceivable. That is, the distance where all the images look the same is identified. One or more of the images may be a control or test image 124 that represents the desired image. The identified distance $D_Y$ is a measure of the color image quality of the image in the group of images with the poorest quality. As a result, if the identified distance $D_Y$ is lower than a predefined acceptable distance, all of the images in the group are acceptable. This allows groups of four to ten images to be easily evaluated simultaneously.

In one embodiment, the method is used to evaluate the image color quality in a variety of different lighting conditions. In this embodiment, a distance where differences between the images become unperceivable or a resolution where differences between the images become unperceivable is identified for each of a plurality of different lighting conditions. For example, color image quality can be tested in fluorescent, outdoor, tungsten, and other lighting conditions.

In one embodiment, the method is performed by executing instructions stored on computer readable media. FIGS. 1 and 11 illustrate a system 20 capable of executing the instructions to perform the method. In the illustrated embodiment, the system facilitates user evaluation of color image quality of an output image 120. The system includes an image output device 122 for providing the output images 124. The illustrated system includes two image output devices, namely a display 47 and a printer 176. The output device to provides an output image, such as a printed color photograph or an image on the display. The system prompts the user to compare the output image and a second image from varying distances or in various resolutions. The system prompts the user to enter a shortest one of the distances or a highest resolution where a difference between the output image and the second image cannot be perceived. The system determines whether the color image quality of the output image is acceptable based on the distance or resolution entered by the user.

While the present invention has been described with a degree of particularity, it is the intent that the invention include all modifications and alterations falling within the spirit or scope of the appended claims.

The invention claimed is:

1. A method of evaluating color image quality of an output image from an image output device, comprising:
 a) viewing an output image from the image output device and a second image from a view point;
 b) identifying a distance between the view point to the output image and the second image where a visual difference between the output image and the second image become unperceivable;
 c) using the identified distance where the visual difference becomes unperceivable as a measure of color image quality.

2. The method of claim 1 wherein the viewing the output image and the second image and the identifying the distance where a visual difference between the output image and the second image becomes unperceivable are performed by a human.

3. The method of claim 1 wherein the second image and an acceptable distance where a visual difference between the output image and the second image become unperceivable are provided as part of a specification of the image output device.

4. The method of claim 1 wherein a relatively shorter identified distance where the visual difference becomes unperceivable is indicative of high color image quality and a relatively longer identified distance where the visual difference becomes unperceivable is indicative of low color image quality.

5. The method of claim 1 wherein the output image device is a color printer and the output image is a printed color photograph.

6. The method of claim 5 wherein the second image is a reference color photograph.

7. The method of claim 1 wherein the output image device is a monitor and the output image is an image provided on the monitor.

8. The method of claim 7 wherein the second image is a reference image provided on a reference monitor.

9. The method of claim 1 wherein a distance between the point of view tithe output image and the second image where a difference between the output image and the second image becomes unperceivable is identified for each of a plurality of different lighting conditions.

10. The method of claim 1 further comprising prompting a user to view the output image and the second image from a view point and prompting the user to enter the distance between the point of view to the output image and the second image where the difference between the output image and the second image becomes unperceivable to the user.

11. The method of claim 1 wherein a plurality of images are viewed from the view point and a distance between the view point and the plurality of images is identified where visual differences between the plurality of images become unperceivable.

12. The method of claim 1 wherein the output image device is an image projecting device and the output image is a projected image.

13. Computer readable media comprising computer-executable instructions for performing the method of claim 1.

14. A method of evaluating color image quality of an output image from an image output device, comprising:
   a) comparing an output image from the image output device and a second image as perceived from a plurality of predefined distances;
   b) identifying a shortest one of the plurality of predefined distances where a difference between the output image and the second image cannot be perceived;
   c) using the identified distance as a measure of color image quality.

15. The method of claim 14 wherein the comparing an output image and the second image as perceived from a plurality of predefined distances and identifying the shortest one of the plurality of predefined distances where a difference between the output image and the second image cannot be perceived are performed by a human.

16. The method of claim 14 wherein the second image and an acceptable distance where a visual difference between the output image and the second image become unperceivable are provided as part of a specification of the image output device.

17. The method of claim 14 wherein a relatively shorter identified distance where the visual difference cannot be perceived is indicative of high color image quality and a relatively longer identified distance where the visual difference cannot be perceived is indicative of low color image quality.

18. The method of claim 14 wherein the output image device is a color printer and the output image is a printed color photograph.

19. The method of claim 18 wherein the second image is a reference color photograph.

20. The method of claim 14 wherein the output image device is a monitor and the output image is an image provided on the monitor.

21. The method of claim 20 wherein the second image is a reference image provided on a reference monitor.

22. The method of claim 14 wherein a distance between the point of view to the output image and the second image where a shortest one of the plurality of predefined distances where a difference between the output image and the second image cannot be perceived is identified for each of a plurality of different lighting conditions.

23. The method of claim 14 further comprising prompting a user to view the output image and the second image from a view point and prompting the user to enter the shortest one of the plurality of predefined distances where a difference between the output image and the second image cannot be perceived for each of a plurality of different lighting conditions.

24. The method of claim 14 wherein a plurality of images are viewed from the view point and a shortest one of the plurality of predefined distances where differences between the plurality of images cannot be perceived is identified.

25. The method of claim 14 wherein the output image device is an image projecting device and the output image is a projected image.

26. Computer readable media comprising computer-executable instructions for performing the method of claim 14.

27. A method of evaluating color image quality of an output image from an image output device, comprising:
   a) setting a distance for viewing an output image from the image output device and a second image;
   b) viewing the output image and the second image from the set distance;
   c) determining whether a difference between the output image and the second image can be perceived from the set distance;
   d) indicating that the color image quality is acceptable, when a difference between the output image and the second image cannot be perceived from the set distance;
   e) indicating that the color image quality is unacceptable, decreasing a resolution for both the output image and the second image, and repeating steps c), d) and e) until the difference between the output image and the second image cannot be perceived from the set distance, when a difference between the output image and the second image can be perceived from the set distance.

28. The method of claim 27 wherein the determining whether a Difference between the output image and the second image can be perceived from the set distance is performed by a human.

29. The method of claim 27 wherein the second image and the set distance are provided as part of a specification of the image output device.

30. The method of claim 27 wherein the output image device is a color printer and the output image is a printed color photograph.

31. The method of claim 30 wherein the second image is a reference color photograph.

32. The method of claim 27 wherein the output image device is a monitor and the output image is an image provided on the monitor.

33. The method of claim 32 wherein the second image is a reference image provided on a reference monitor.

34. The method of claim 27 wherein whether a difference between the output image and the second image can be perceived from the set distance is determined for each of a plurality of different lighting conditions.

35. The method of claim 27 further comprising prompting a user to view the output image and the second image from the set distance and prompting the user to input whether a difference between the output image and the second image can be perceived from the set distance.

36. The method of claim 27 wherein a plurality of images are viewed from the set distance and determining whether a difference between the output image and the second image can be perceived from the set distance.

37. The method of claim 27 wherein the output image device is an image projecting device and the output image is a projected image.

38. Computer readable media comprising computer-executable instructions for performing the method of claim 27.

39. A method of evaluating color image quality of an output image from an image output device, comprising:
   a) comparing an output image from the image output device and a second image as displayed in a plurality of predefined resolutions, wherein comparing the output image from the image output device and the second image as displayed in a plurality of predefined resolutions includes:
      comparing the output image at a first predefined resolution to the second image at the first predefined resolution, and
      comparing the output image at a second predefined resolution to the second image at the second predefined resolution;
   b) identifying a highest one of the plurality of predefined resolutions where a difference between the output image and the second image cannot be perceived;
   c) using the identified resolution as a measure of color image quality.

40. The method of claim 39 wherein the comparing an output image and the second image as displayed in a plurality of predefined resolutions and identifying the highest one of the plurality of predefined resolutions where a difference between the output image and the second image cannot be perceived are performed by a human.

41. The method of claim 39 wherein a relatively higher identified resolution where the visual difference cannot be perceived is indicative of high color image quality and a relatively lower identified resolution where the visual difference cannot be perceived is indicative of low color image quality.

42. The method of claim 39 wherein the output image device is a monitor and the output image is an image provided on the monitor.

43. The method of claim 39 wherein the second image is a reference image provided on a reference monitor.

44. The method of claim 39 wherein a plurality of images are viewed and a highest one of the plurality of predefined resolutions where differences between the plurality of images cannot be perceived is identified.

45. The method of claim 39 wherein the output image device is an image projecting device and the output image is a projected image.

46. Computer readable media comprising computer-executable instructions for performing the method of claim 39.

47. A system for user evaluation of color image quality of an output image, comprising:
  a) a user input device;
  b) an image output device for providing the output images;
  c) a memory in which machine instructions are stored; and
  e) a processor that is coupled to the user input device, the user output device, and to the memory, the processor executing the machine instructions to carry out a plurality of functions, including:
    i) causing the user output device to provide an output image;
    ii) prompting a user to compare the output image and a second image from a plurality of predefined distances;
    iii) prompting the user to enter a shortest one of the plurality of predefined distances where a difference between the output image and the second image cannot be perceived through the user input device;
    iv) determining whether the color image quality of the output image is acceptable based on the distance entered by the user.

48. The system of claim 47 wherein the output image device is a color printer and the output image is a printed color photograph.

49. The system of claim 47 wherein the second image is a reference color photograph.

50. The system of claim 47 wherein the output image device is a monitor and the output image is an image provided on the monitor.

51. The system of claim 50 wherein the second image is a reference image provided on a reference monitor.

52. A method of evaluating color image quality of an output image from an image output device, comprising:
  a) setting a distance for viewing an output image from the image output device and a second image, wherein the output image device is a color printer and the output image is a printed color photograph;
  b) viewing the output image and the second image from the set distance;
  c) determining whether a difference between the output image and the second image can be perceived from the set distance;
  d) indicating that the color image quality is acceptable when a difference between the output image and the second image cannot be perceived from the set distance; and
  e) indicating that the color image quality is unacceptable when a difference between the output image and the second image can be perceived from the set distance.

53. The method of claim 52 wherein the second image is a reference color photograph.

54. A method of evaluating color image quality of an output image from an image output device, comprising:
  a) setting a distance for viewing an output image from the image output device and a second image, wherein the output image device is an image projecting device and the output image is a projected image;
  b) viewing the output image and the second image from the set distance;
  c) determining whether a difference between the output image and the second image can be perceived from the set distance;
  d) indicating that the color image quality is acceptable when a difference between the output image and the second image cannot be perceived from the set distance;
  e) indicating that the color image quality is unacceptable when a difference between the output image and the second image can be perceived from the set distance.

55. A method of evaluating color image quality of an output image from an image output device, comprising:
  a) comparing an output image from the image output device and a second image as displayed in a plurality of predefined resolutions;
  b) identifying a highest one of the plurality of predefined resolutions where a difference between the output image and the second image cannot be perceived;
  c) using the identified resolution as a measure of color image quality, wherein a plurality of images are viewed and a highest one of the plurality of predefined resolutions where differences between the plurality of images cannot be perceived is identified.

56. A method of evaluating color image quality of an output image from an image output device, comprising:
  a) comparing an output image from the image output device and a second image as displayed in a plurality of predefined resolutions, wherein the output image device is an image projecting device and the output image is a projected image;
  b) identifying a highest one of the plurality of predefined resolutions where a difference between the output image and the second image cannot be perceived;
  c) using the identified resolution as a measure of color image quality.

* * * * *

UNITED STATES PATENT AND TRADEMARK OFFICE
CERTIFICATE OF CORRECTION

PATENT NO.         : 7,460,270 B2
APPLICATION NO.    : 10/793044
DATED              : December 2, 2008
INVENTOR(S)        : Michael Stokes et al.

It is certified that error appears in the above-identified patent and that said Letters Patent is hereby corrected as shown below:

In column 8, line 50, in Claim 9, delete "tithe" and insert -- to the --, therefor.

In column 10, line 15, in Claim 28, delete "Difference" and insert -- difference --, therefor.

Signed and Sealed this
Tenth Day of May, 2011

David J. Kappos
*Director of the United States Patent and Trademark Office*